Patented Aug. 18, 1936

2,051,148

UNITED STATES PATENT OFFICE 2,051,148

WATERSOLUBLE DIAZOAMINO COMPOUNDS

Wilhelm Neelmeier, Wilhelm Meiser, and Otto Goll, Leverkusen-I. G.-Werk, and Heinrich Morschel, Cologne-Deutz, Germany, assignors to General Aniline Works, Inc., New York, N. Y., a corporation of Delaware No Drawing. Application May 11, 1933, Serial No. 670,570. In Germany May 23, 1932

15 Claims. (Cl. 260—46.2)

The present invention relates to new watersoluble diazoamino compounds and to a process of preparing azodyestuffs with the aid of said diazoamino compounds.

In U. S. Patents Nos. 1,880,522, and 1,893,991 there is disclosed for example the production of dyestuffs by the dyeing or printing process with the aid of diazoamino compounds from a diazo or tetrazo compound capable of producing azodyestuffs and secondary aliphatic amines of the general formula:

wherein among others $R_1$ and $R_2$ jointly stand for a pentamethylene chain. The diazoamino compounds used in the said U. S. patents are free from groups inducing solubility in water.

An improvement in the art brings about the use of diazoamino compounds containing groups inducing solubility in water. Such compounds and their use for the manufacture of azodyestuffs has been described in U. S. Patents 1,882,556, 1,882,560, 1,882,561 and 1,882,562. In this literature there is disclosed for instance the production of watersoluble diazoamino compounds from a diazo or tetrazo compound capable of producing azodyestuffs and secondary aliphatic amines of the general formula:

wherein $R_1$ and $R_2$ stand for either the same or different alkyl residues, but at least one of the symbols $R_1$ and $R_2$ stand for an alkyl residue which contains a substituent inducing solubility in water, such as the —COOH, —SO₃H and —OSO₂H group.

It is also disclosed that these watersoluble diazoamino compounds may be mixed in a dry state with about equivalent quantities of a coupling component free from sulfonic or carboxylic acid groups and suitable for preparing azodyestuffs. Dyeing preparations are thus obtained which can be dissolved in water or in water-containing alkali and are then ready for use in dyeing or printing. On acidification of the solution, the diazoamino compound is split up into the two components, whereupon coupling between the diazo compound and the coupling component present occurs.

Now we have found that similar watersoluble diazoamino compounds can be prepared by using in place of the aforesaid and previously described secondary aliphatic amines a secondary amine in which the NH group forms part of a ring system, i. e. is cyclically bound and which secondary amine contains one or more substituents inducing solubility in water, such as the —SO₃H, —COOH, —OSO₂H and —OSO₃H groups.

Such secondary amines or cyclic imines are, for example, the carboxylic or sulfonic acids of cyclic amines containing the NH-group in a five- or six-membered nucleus, such as, piperidine and its homologues, tetrahydroquinoline, pyrrol compounds or the partially or wholly hydrogenated derivatives thereof, such as 2,3-dialkylindol, indoline, carbazole, tetrahydrocarbazole, hexahydrocarbazole, benzodihydrocarbazole and the like and their substitution products. Their distinguishing feature aside from the presence of the aforesaid solubilizing groups is the presence of the NH-group in a cyclic imino linkage, i. e. —C—NH—C—.

Our new watersoluble diazoamino compounds which may be represented by the probable general formula:

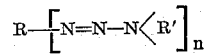

wherein R stands for the radical of a primary amine suitable for producing azodyestuffs being free from a substituent inducing solubility in water and which may contain an azo group,

stands for the radical of a secondary cyclic amine containing at least one group inducing solubility in water, and "n" stands for one of the numbers one and two, are obtainable according to methods known per se by diazotizing or tetrazotizing a primary amine suitable for producing azodyestuffs and free from a group inducing solubility in water in the usual manner in aqueous solution or suspension with hydrochloric or sulfuric acid and sodium nitrite, and introducing the diazo solution into the solution of a secondary cyclic amine containing at least one group inducing solubility in water, care being taken that an acid-binding agent, such as magnesia, sodium acetate, a caustic alkali, an alkali metal carbonate or bicarbonate, pyridine, and the like, is present for removing the free acid liberated in the condensation process. Generally the process is carried out at low temperature, say at about 0° C. to about 20° C., and favorably the two reacting components are applied in about equimolecular proportions.

The new condensation products either separate during the reaction or are salted out with potassium or sodium chloride when the reaction is complete after a short time.

As substituents which may be present in the radical R there may be mentioned by way of example alkyl, alkoxy, halogen, the nitro group and a substituted amino group, such as an acylamino or alkylamino group, while in the radical of the secondary cyclic amine in addition to at least one group inducing solubility in water there may be present, for example, the same substituents.

In carrying out our new process it should be borne in mind that some cyclic secondary amines undergo a coupling with diazo compounds to a carbon atom with the formation of the normal azodyestuffs, and it is self-understood that such cyclic imines do not come into consideration for the purpose of the invention. Thus, for example, the tetrahydroquinoline-8-sulfonic acid undergoes coupling with diazo compounds in the 6-position with formation of the corresponding azodyestuffs; in order to exclude the C-couping it is therefore necessary to work with a tetrahydroquinoline-8-sulfonic acid in which the 6-position bears a substituent, or in case of the 2-methylindol-sulfonic acid (obtained by sulfonating 2-methylindol), the 3-position must bear a substituent.

Generally speaking, when working with a cyclic amine which undergoes a C-coupling, the position or positions in which the C-coupling would enter, are to be substituted by substituents.

Our new diazoamino compounds are in form of their alkali metal salts generally colorless to brownish colored crystals. They are generally stable both in the dry state and also in aqueous neutral or alkaline solution. By the action of an acid, for example by the addition of a mineral acid or an acid mineral acid salt, such as sodium bisulfate, or a strong organic acid, such as acetic acid, formic acid and oxalic acid, they are split up into the two starting components, that means, into the diazo compound and the secondary cyclic amine.

A further step of our invention resides in working our new diazo amino compounds into new compositions of matter suitable for dyeing and printing processes.

We have found that a water- or alkali-soluble composition for dyeing and printing is obtained when mixing in the free state a watersoluble diazoamino compound of the kind referred to above with a coupling component suitable for producing azodyestuffs free from a group inducing solubility in water, such as the sulfonic acid and carboxylic acid group.

As coupling components there may be mentioned by way of example, naphthol, naphtholates, 2,3-hydroxynaphthoic acid arylides, methylphenyl-pyrazolones, acetoacetic acid arylides, 2-hydroxy-carbazole-3-carboxylic acid arylides, 2,4-dihydroxyquinolines, 2,3-hydroxyanthracene carboxylic acid arylides, hydroxy-benzo-carbazole-o-carboxylic acid arylides, and the like.

The relative quantities of the two components present in our new compositions of matter may be varied within the widest limits, but we prefer to mix together about equivalent quantities of the diazoamino compound and of the coupling component.

Our new compositions are valuable for dyeing and printing; for the production of fast dyeings on the fibre it is only necessary to dissolve these compositions in water or in water-containing alkali, in order to obtain dyestuff preparations ready for use in dyeing and printing. On acidification, the diazoamino compound is split up into the two components, whereupon coupling between the diazo compound and the coupling component present occurs.

Further, according to the invention azodyestuffs in substance are prepared by dissolving a diazoamino compound of the kind above identified in water and adding thereto an about equivalent quantity of any coupling component suitable for producing azodyestuffs containing no group inducing solubility in water, such as the sulfonic acid and carboxylic acid group in an aqueous solution. Then the mixture is acidified by a strong organic acid, such as formic acid, acetic acid or oxalic acid. The formation of the dyestuff begins immediately and can be accelerated by slowly heating, say to about 50–60° C.

If the solution is acidified with a mineral acid or an acid mineral acid salt, for example hydrochloric acid or sodium bisulfate, the decomposition of the condensation product proceeds more quickly; but in this case the free mineral acid must be suitably neutralized, for example by the addition of sodium acetate, for effecting the coupling.

Otherwise the dyestuff may be prepared by introducing the aqueous solution of a coupling component containing no sulfonic acid and no carboxylic acid group into the aqueous solution of the condensation product to which an acid previously has been added; this method of preparing the dyestuff is equivalent to that described above.

In preparing the dyestuff on the fibre, especially on the cellulosic fibre, such as cotton, the material to be dyed is impregnated with a grounding liquor containing a coupling component which is not substituted by a group inducing solubility in water, such as the carboxylic or sulfonic acid group, for example, a 2,3-hydroxy-naphthoic acid arylide or a naphthol, centrifuged, wrung and developed for about half an hour in a diazo bath prepared from a diazoamino compound of the kind referred to above, rinsed, soaped at the boil, rinsed and dried.

For example, for dyeing 50 grams of cotton, the grounding liquor is prepared by dissolving together about ½ gram to about 5 grams of the coupling component, about 1 to about 10 ccs. of caustic soda lye of 34° Bé., and about 1 to about 10 ccs. of Turkey red oil of 50% strength and making up the whole with water to 1 litre.

The developing or diazo bath is prepared by dissolving about 3 to about 10 grams of the above identified condensation product in 1 litre of water and adding thereto the necessary quantity of an acid, preferably formic acid or acetic acid, generally 20 to 50 ccs. of the concentrated acid being sufficient for 1 litre. Into this solution there is introduced the cotton impregnated with the coupling component, the bath is advantageously slowly heated to about 50–60° C., and when the diazo compound can no more be detected, the cotton is rinsed, soaped at the boil, rinsed and dried.

Our new process is favorably used for preparing dyeings on the fibre according to the printing process. The new printing paste used for this purpose is prepared by mixing together about equivalent quantities of a condensation product as above identified and a coupling component, containing no group inducing solubility in water, especially a 2,3-hydroxy-naphthoic acid arylide, adding to the mixture caustic soda lye in a quantity sufficient for dissolving the components and making up the mixture to a printing paste in the usual manner by adding thereto a thickening agent, such as starch or gum tragacanth and the necessary quantity of water, and if desired, Turkey red oil. The fibre is printed with this printing paste in the usual manner, then it is dried, and the dyeing is developed by splitting up by the action of an acid the diazoamino compound present in the printing paste into the two components, whereupon coupling with formation of the azodyestuff occurs. This splitting up of the diazoamino compound may be performed by treating the print for a short time, say for about 20 seconds, in a bath containing an acid and if desired a suitable salt, such as Glauber's salt, sodium chloride or the like, for example by passing the printed fibres through a bath containing about 5–10% of formic acid or acetic acid and 10% of Glauber's salt at an elevated temperature, say at temperatures between 50 and 90° C., or by subjecting the print to the action of steam containing a volatile acid, such as formic and/or acetic acid.

The invention is illustrated by the following examples, without being limited thereto:

*Example 1.*—Into an aqueous solution prepared from 20 grams of the sodium salt of 2,3-dimethylindol-5-sulfonic acid, obtainable from phenylhydrazine-4-sulfonic acid and methylethylketone according to the process described in German Patent 566,949, and 25 grams of calcined soda, a diazo solution prepared from 11.4 grams of 4-chloro-2-anisidine is introduced at 15° C. The coupling is soon complete. The brownish colored diazoamino compound having in its free state the following formula:

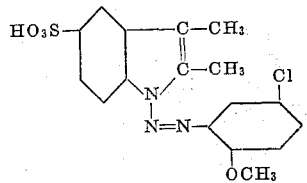

partially separates during the reaction and is completely precipitated by the addition of common salt.

*Example 2.*—Into an aqueous solution prepared from 21 grams of the sodium salt of 2,3,5-trimethylindol-7-sulfonic acid obtainable from 4-methylphenylhydrazine-3-sulfonic acid and methylethylketone in accordance with the process described in German Patent 566,949, and 25 grams of calcined soda, a diazo solution prepared from 11 grams of 4-methyl-2-nitraniline is introduced at 15° C. The brownish colored diazoamino compound having in its free state the following formula:

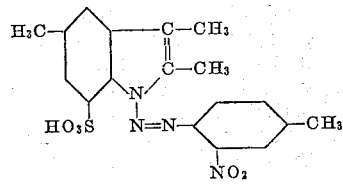

partially separates during the reaction and is completely precipitated by the addition of common salt.

*Example 3.*—Into an aqueous solution prepared from 19 grams of the sodium salt of 2-methyl-2,3-dihydroindol-sulfonic acid, obtainable by sulfonating 2-methyl-2,3-dihydroindol, and 25 grams of calcined soda, a diazo solution prepared from 9.2 grams of m-chloroaniline is introduced at 15° C. The yellowish colored diazoamino compound having in its free state the following formula:

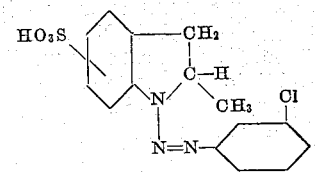

separates.

*Example 4.*—Into an aqueous soda alkaline suspension prepared from 21.4 grams of the sodium salt of carbazole-2-sulfonic acid containing 25 grams of soda, a diazo solution prepared from 11.4 grams of 4-chloro-2-anisidine is introduced at 15° C. The difficultly soluble diazoamino compound having in its free state the following formula:

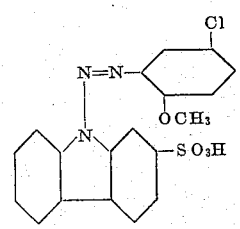

separates.

*Example 5.*—Into an aqueous solution prepared from 21.7 grams of the sodium salt of 1,2,3,4-tetrahydrocarbazole-7-sulfonic acid, obtainable from phenylhydrazine-3-sulfonic acid and cyclohexanone in accordance with the process described in German Patent 454,759, and 25 grams of calcined soda, a diazo solution prepared from 9.2 grams of m-chloroaniline at 15° C. When the coupling is complete, the solution is heated to 40° C., and the yellowish colored diazoamino compound having in its free state the following formula:

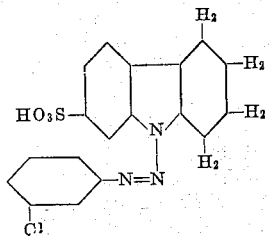

is salted out by the addition of common salt.

*Example 6.*—Into an aqueous solution prepared from 30 grams of 1,2,3,4-tetrahydrocarbazole-5,8-di-sodium-sulfonate, obtainable from phenylhydrazine-2,5-disulfonic acid and cyclohexanone in accordance with the process described in German Patent 454,759, and 25 grams of calcined soda, a diazo solution prepared from 10 grams of o-nitraniline is introduced at 15° C. The yellow colored diazoamino compound having in its free state the following formula:

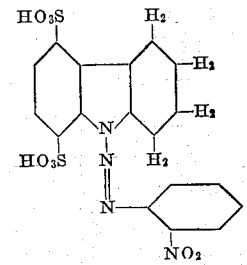

is separated by the addition of common salt.

*Example 7.*—Into an aqueous solution prepared from 19 grams of 1,2,3,4-tetrahydrocarbazole-6-carboxylic acid (sodium salt), obtainable from phenylhydrazine-4-carboxylic acid and cyclohexanone in accordance with the process described in German Patent 454,759, and 25 grams of calcined soda, a diazo solution prepared from 1,3 grams of 4-chloro-2-toluidine is introduced at 15° C. The diazoamino compound formed having in its free state the following formula:

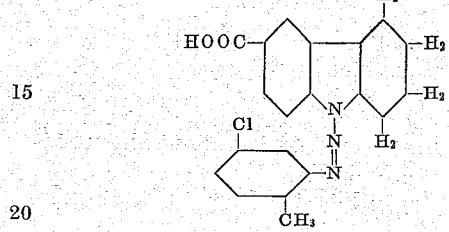

separates.

*Example 8.*—Into an aqueous solution prepared from 27 grams of the sodium salt of 1,2,3,4-tetrahydrocarbazole-6-sulfo-8-carboxylic acid, obtainable from phenylhydrazine-4-sulfo-2-carboxylic acid and cyclohexanone in accordance with the process described in German Patent 454,759, and 25 grams of calcined soda, the diazo solution prepared from 16,2 grams of α-aminoanthraquinone is introduced at 15° C., while stirring. When the coupling is complete, the brownish colored diazoamino compound having in its free state the following formula:

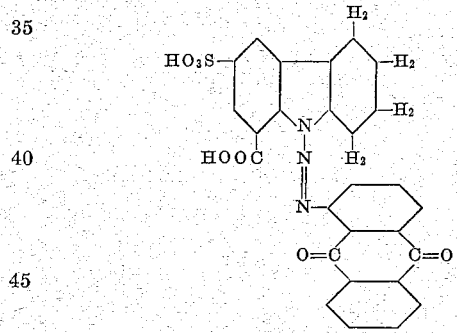

is precipitated by the addition of common salt.

*Example 9.*—Into an aqueous solution prepared from 25,5 grams of 1,2-benzo-3,4-dihydrocarbazole-7-sulfonic acid (sodium salt), obtainable from phenylhydrazine-3-sulfonic acid and α-tetralone in accordance with the process described in German Patent No. 454,759, and 25 grams of calcined soda, a diazo solution prepared from 9,2 grams of m-chloroaniline is introduced at 15° C. The diazoamino compound formed having in its free state the following formula:

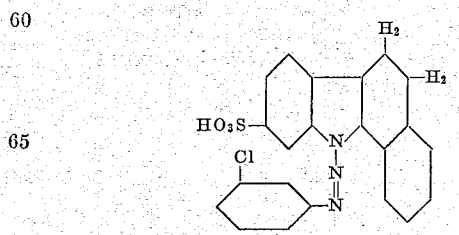

separates in an oily form when salted out, said oil becoming a light yellow colored crystal magma on stirring.

*Example 10.*—Into an aqueous solution prepared from 22 grams of the sodium salt of hexahydrocarbazolesulfonic acid, obtainable by sulfonating hexahydrocarbazole, and 25 grams of calcined soda, a diazo solution from 10.3 grams of 4-chloro-2-toluidine is introduced at 15° C. The yellow colored diazoamino compound having in its free state the following formula:

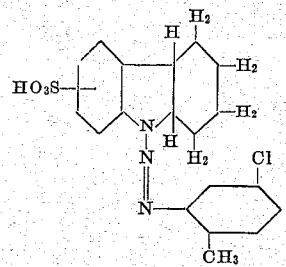

separates.

We claim:

1. Diazoamino compounds of the probable general formula:

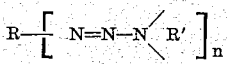

wherein R stands for the radical of a diazotized primary amine suitable for producing azodyestuffs free from a group inducing solubility in water and which may contain an azo group,

stands for the radical of a secondary cyclic amine of the carbazole or indol series containing as substituent at least one group inducing solubility in water, and "n" stands for one of the numbers one and two, being in form of their alkali metal salts generally colorless to brownish colored crystals and being split up by the action of an acid into the starting diazo compound and the starting secondary cyclic amine.

2. Diazoamino compounds of the probable general formula:

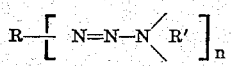

wherein R stands for the radical of a diazotized primary amine suitable for producing azodyestuffs which may bear substituents selected from the group consisting of alkyl, alkoxy, halogen, the nitro group and a substituted amino group,

stands for the radical of a secondary cyclic amine of the carbozole or indol series containing at least one substituent selected from the group consisting of the sulfonic acid group, the carboxylic acid group, the sulfuric acid ester group, the sulfurous acid ester group, and which may bear further substituents selected from the group consisting of alkyl, alkoxy, halogen, the nitro group and a substituted amino group, and "n" stands for one of the numbers one and two, being in form of their alkali metal salts generally colorless to brownish colored crystals and being split up by the action of an acid into the starting diazo compound and the starting secondary cyclic amine.

3. Diazoamino compounds of the probable general formula:

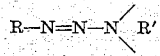

wherein R stands for the radical of a diazotized primary amine suitable for producing azodyestuffs free from a group inducing solubility in water and which may contain an azo group, and

stands for the radical of a secondary cyclic amine of the carbazole or indol series containing as substituent at least one group inducing solubility in water, being in form of their alkali metal salts generally colorless to brownish colored crystals and being split up by the action of an acid into the starting diazo compound and the starting secondary cyclic amine.

4. Diazoamino compounds of the probable general formula:

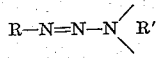

wherein R stands for the radical of a diazotized primary amine suitable for producing azodyestuffs which may bear substituents selected from the group consisting of alkyl, alkoxy, halogen, the nitro group and a substituted amino group, and

stands for the radical of a secondary cyclic amine of the carbazole or indol series containing at least one substituent selected from the group consisting of the sulfonic acid group, the carboxylic acid group, the sulfuric acid ester group, the sulfurous acid ester group, and which may bear further substituents selected from the group consisting of alkyl, alkoxy, halogen, the nitro group and a substituted amino group, being in form of their alkali metal salts generally colorless to brownish colored crystals and being split up by the action of an acid into the starting diazo compound and the starting secondary cyclic amine.

5. Diazoamino compounds of the probable general formula:

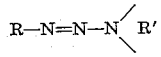

wherein R stands for the radical of the benzene or naphthalene series which may bear substituents selected from the group consisting of alkyl, alkoxy, halogen, the nitro group and a substituted amino group and

stands for the radical of a secondary cyclic amine of the carbazole or indol series containing at least one substituent selected from the group consisting of the sulfonic acid group, the carboxylic acid group, the sulfuric acid ester group, the sulfurous acid ester group, and which may bear further substituents selected from the group consisting of alkyl, alkoxy, halogen, the nitro group and a substituted amino group, being in form of their alkali metal salts generally colorless to brownish colored crystals and being split up by the action of an acid into the starting diazo compound and the starting cyclic amine.

6. Diazoamino compounds of the general formula:

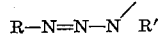

wherein R stands for the radical of a diazotized primary amine suitable for producing azodyestuffs free from a group inducing solubility in water, and

stands for a pyrrole radical having condensed to at least one of the two positions 1,2 and 3,4 a benzo or naphtho nucleus containing as substituent at least one group inducing solubility in water, being in form of their alkali metal salts generally colorless to brownish colored crystals and being split up by the action of an acid into the starting diazo compound and the starting secondary cyclic amine.

7. Diazoamino compounds of the general formula:

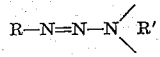

wherein R stands for the radical of a diazotized primary amine suitable for producing azodyestuffs free from a group inducing solubility in water, and

stands for a pyrrole radical having condensed to at least one of the two positions 1,2 and 3,4 a benzo nucleus containing as substituent a sulfonic acid or a carboxylic acid group, being in form of their alkali metal salts generally colorless to brownish colored crystals and being split up by the action of an acid into the starting diazo compound and the starting secondary cyclic amine.

8. Diazoamino compounds of the general formula:

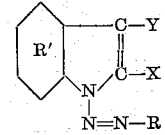

wherein R stands for the radical of a diazotized primary amine suitable for producing azodyestuffs free from a group inducing solubility in water, X means hydrogen or alkyl and Y means alkyl, or X and Y jointly stand for a tetramethylene chain, and wherein the benzene nucleus R' contains as substituent at least a sulfonic acid or a carboxylic acid group, being in form of their alkali metal salts generally colorless to brownish colored crystals and being split up by the action of an acid into the starting diazo compound and the starting secondary cyclic amine.

9. Diazoamino compounds of the general formula:

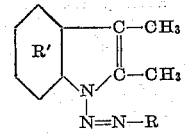

wherein R stands for the radical of a diazotized primary amine suitable for producing azodyestuffs free from a group inducing solubility in water, and wherein the benzene nucleus R' contains as substituent at least a sulfonic acid or a carboxylic acid group being in form of their alkali metal salts generally colorless to brownish colored crystals and being split up by the action of an acid into the starting diazo compound and the starting secondary cyclic amine.

10. Diazoamino compounds of the general formula:

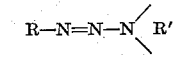

wherein R stands for a radical of the benzene series free from a group inducing solubility in water, and

stands for a pyrrole radical having condensed to at least one of the two positions 1,2 and 3,4 a benzo or naphtho nucleus containing as substituent at least one group inducing solubility in water, being in form of their alkali metal salts generally colorless to brownish colored crystals and being split up by the action of an acid into the starting diazo compound and the starting secondary cyclic amine.

11. Diazoamino compounds of the general formula:

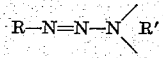

wherein R stands for a radical of the benzene series free from a group inducing solubility in water, and

stands for a pyrrole radical having condensed to at least one of the two positions 1,2 and 3,4 a benzo nucleus containing as substituent a sulfonic acid or a carboxylic acid group, being in form of their alkali metal salts generally colorless to brownish colored crystals and being split up by the action of an acid into the starting diazo compound and the starting secondary cyclic amine.

12. Diazoamino compounds of the general formula:

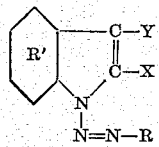

wherein R stands for a radical of the benzene series free from a group inducing solubility in water, X means hydrogen or alkyl and Y means alkyl, or X and Y jointly stand for a tetramethylene chain, and wherein the benzene nucleus R' contains as substituent at least a sulfonic acid or a carboxylic acid group, being in form of their alkali metal salts generally colorless to brownish colored crystals and being split up by the action of an acid into the starting diazo compound and the starting secondary cyclic amine.

13. Diazoamino compounds of the general formula:

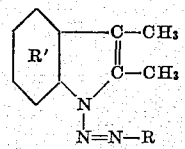

wherein R stands for a radical of the benzene series free from a group inducing solubility in water, and wherein the benzene nucleus R' contains as substituent at least a sulfonic acid or a carboxylic acid group, being in form of their alkali metal salts generally colorless to brownish colored crystals and being split up by the action of an acid into the starting diazo compound and the starting secondary cyclic amine.

14. The diazoamino compound having in the free state the following formula:

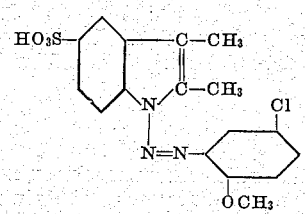

being in form of its alkali metal salts a brownish colored crystalline substance and being split up by the action of an acid into the 2,3-dimethylindol-5-sulfonic acid and the diazotized 4-chloro-2-anisidine.

15. The diazoamino compound having in the free state the following formula:

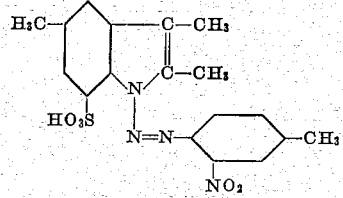

being in form of its alkali metal salts a brownish colored crystalline substance and being split up by the action of an acid into the 2,3,5-trimethylindol-7-sulfonic acid and the diazotized 4-methyl-2-nitraniline.

WILHELM NEELMEIER.
WILHELM MEISER.
OTTO GOLL.
HEINRICH MORSCHEL.